United States Patent
Minase et al.

(10) Patent No.: US 9,423,802 B2
(45) Date of Patent: Aug. 23, 2016

(54) APPARATUS FOR CONTROLLING VEHICLE

(75) Inventors: Yuki Minase, Toyota (JP); Masashi Takagi, Nagoya (JP); Motonari Ohbayashi, Nisshin (JP); Hiroshi Shimada, Tajimi (JP); Toshihiro Takagi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/366,138

(22) PCT Filed: Dec. 21, 2011

(86) PCT No.: PCT/JP2011/079673
§ 371 (c)(1),
(2), (4) Date: Jun. 17, 2014

(87) PCT Pub. No.: WO2013/094035
PCT Pub. Date: Jun. 27, 2013

(65) Prior Publication Data
US 2014/0330500 A1 Nov. 6, 2014

(51) Int. Cl.
*G05D 13/04* (2006.01)
*F02D 41/10* (2006.01)
*B60W 50/038* (2012.01)
*F02D 41/02* (2006.01)
*F02D 41/22* (2006.01)

(52) U.S. Cl.
CPC ............. *G05D 13/04* (2013.01); *B60W 50/038* (2013.01); *F02D 41/10* (2013.01); *B60W 2520/105* (2013.01); *B60W 2540/10* (2013.01); *B60W 2720/10* (2013.01); *F02D 41/021* (2013.01); *F02D 41/222* (2013.01); *F02D 2200/501* (2013.01); *F02D 2250/26* (2013.01)

(58) Field of Classification Search
CPC ............... G05D 13/04; B60W 50/038; B60W 2520/105; B60W 2540/10; B60W 2720/10; F02D 41/10; F02D 41/021; F02D 41/222; F02D 2250/26; F02D 2200/501
USPC .......................................................... 701/70
See application file for complete search history.

(56) References Cited

U.S. PATENT DOCUMENTS

| | | | |
|---|---|---|---|
| 6,199,535 B1 * | 3/2001 | Hara | F02D 11/107 123/396 |
| 7,103,460 B1 * | 9/2006 | Breed | 701/32.9 |
| 2005/0192727 A1 * | 9/2005 | Shostak et al. | 701/37 |
| 2009/0267921 A1 * | 10/2009 | Pryor | 345/177 |
| 2010/0204881 A1 * | 8/2010 | Muragishi et al. | 701/36 |
| 2013/0116874 A1 * | 5/2013 | Ichinose et al. | 701/22 |
| 2014/0039757 A1 * | 2/2014 | Prakah-Asante et al. | 701/36 |
| 2014/0046777 A1 * | 2/2014 | Markey et al. | 705/14.66 |

FOREIGN PATENT DOCUMENTS

| | | |
|---|---|---|
| JP | 2004-360706 A | 12/2004 |
| JP | 2005-023916 A | 1/2005 |

* cited by examiner

*Primary Examiner* — McDieunel Marc
*Assistant Examiner* — James E Stroud
(74) *Attorney, Agent, or Firm* — Kenyon & Kenyon LLP

(57) ABSTRACT

An electronic control unit reduces output of an engine using a detection value of an acceleration sensor such that acceleration of a vehicle does not exceed a predetermined threshold value. In a case where there is an abnormality in the acceleration sensor, the electronic control unit sets the acceleration threshold value to be greater than that in a case where there is no abnormality, and the electronic control unit limits the vehicle speed to a predetermined value or slower.

5 Claims, 4 Drawing Sheets

APPARATUS FOR CONTROLLING VEHICLE

CROSS-REFERENCE TO RELATED APPLICATIONS

This is a national phase application based on the PCT International Patent Application No. PCT/JP2011/079673 filed Dec. 21, 2011, the entire contents of which are incorporated herein by reference.

TECHNICAL FIELD

The present invention relates to an apparatus for controlling a vehicle.

BACKGROUND ART

As an apparatus for controlling a vehicle, an apparatus has conventionally been known that, upon detecting an inappropriate accelerator operation, e.g. an accelerator operation in which the driver presses excessively hard on the accelerator pedal, performs an output reduction process of setting the output from the engine to be lower than an output based on the amount of operation of the accelerator pedal.

Further, for example, an apparatus disclosed in Patent Document 1 is configured to give a warning to the driver upon detecting an inappropriate accelerator operation. This apparatus is configured such that upon detecting an inappropriate accelerator operation on the basis of the road gradient and the amount of accelerator operation, the apparatus determines whether the rate of change in vehicle speed as calculated from a value detected by a sensor of the vehicle, i.e. the amount of change in acceleration, is equal to or greater than a determination value. When the amount of change in acceleration is greater than or equal to the determination value, the apparatus gives a warning to the driver.

PRIOR ART DOCUMENTS

Patent Documents

Patent Document 1: Japanese Laid-Open Patent Publication No. 2005-23916

SUMMARY OF THE INVENTION

Problems that the Invention is to Solve

In the apparatus disclosed in Patent Document 1, an abnormality in the sensor makes it impossible to accurately measure the acceleration. For this reason, even if the actual amount of change in acceleration is less than the determination value, for example, the apparatus may give a warning, thus posing a risk of deterioration of drivability.

Another possible example of the aforementioned output reduction process is to reduce the output from the engine so that the acceleration of the vehicle does not exceed a predetermined threshold value or to reduce the output from the engine with the use of a parameter (such as the acceleration of the vehicle) that indicates the traveling state of the vehicle that varies according to the amount of accelerator operation. However, even in these cases, an abnormality in a section for detecting the acceleration or in a detection section for detecting the parameter makes it impossible to accurately measure the acceleration or the parameter. This makes the acceleration insufficient as a result of being reduced by performing the output reduction process, thus undesirably causing deterioration of drivability.

Accordingly, it is an objective of the present invention to improve drivability.

Means for Solving the Problems

To achieve the foregoing objective and in accordance with one aspect of the present invention, an apparatus for controlling a vehicle is provided that includes an acceleration detection section that detects an acceleration of the vehicle and a control section that executes an output reduction process of reducing an output from a power source of the vehicle with use of a value detected by the acceleration detection section, such that the acceleration does not exceed a predetermined threshold value. When there is an abnormality in the acceleration detection section, the control section sets the threshold value to be greater than that in a case in which there is no abnormality in the acceleration detection section, and limits a vehicle speed to a predetermined value or lower.

The foregoing configuration performs the process of reducing the output from the power source with the use of the value detected by the acceleration detection section, such that the acceleration of the vehicle does not exceed the predetermined threshold value. Moreover, when there is an abnormality in the acceleration detection section, the threshold value is made greater. This makes it less likely that the acceleration of the vehicle is limited more than necessary. This also makes it possible to avoid deterioration of drivability such as insufficient acceleration, thus improving drivability.

MODES FOR CARRYING OUT THE INVENTION

First Embodiment

An apparatus for controlling a vehicle according to a first embodiment of the present invention will be described below with reference to FIGS. 1 through 6. The control apparatus of the present embodiment is applied to a vehicle configured to generate drive force through the output from an engine 6 serving as a power source.

Figure 1:
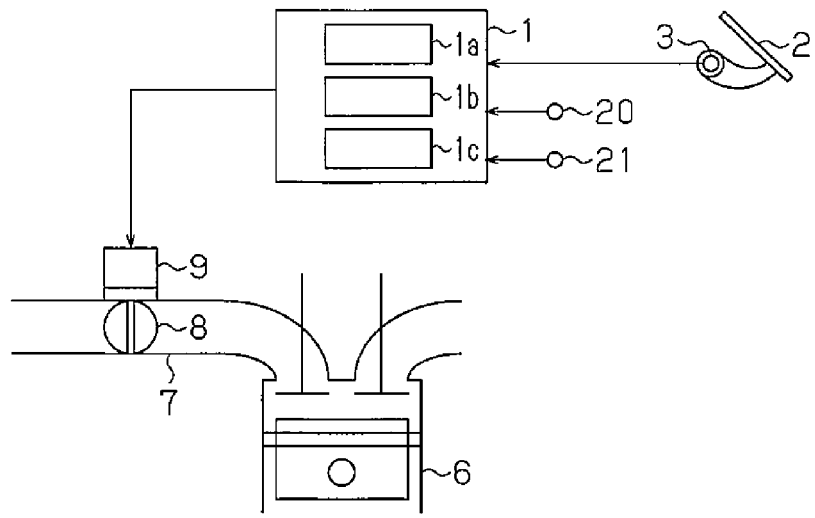
FIG. 1 is a schematic diagram showing an overall configuration of a first embodiment of the present invention.

As shown in FIG. 1, the apparatus of the present embodiment for controlling a vehicle is composed mainly of an on-board electronic control unit 1. The electronic control unit 1, which serves as a control section, includes a central processing unit (CPU) 1$a$, which executes various types of arithmetic processing concerning vehicle control, a read-only memory (ROM) 1$b$, in which control programs and data are stored, and a random access memory (RAM) 1$c$, in which computation results of the CPU 1$a$ and results of detection as yielded by sensors are temporarily stored.

The electronic control unit 1 is connected to sensors and switches provided in various parts of the vehicle, e.g. an accelerator pedal sensor 3, a vehicle speed sensor 20, and an acceleration sensor 21. The accelerator pedal sensor 3 detects an amount of accelerator operation ACCP, i.e. an amount by which the driver presses on the accelerator pedal (accelerator operation member) 2. The vehicle speed sensor 20 detects the speed of the vehicle (vehicle speed V). The acceleration sensor 21 serves as an acceleration detection section for detecting the acceleration of the vehicle. The acceleration that is detected by the acceleration sensor 21 is hereinafter referred to as sensor acceleration SA.

The electronic control unit 1 is also connected to actuators provided in various parts of the vehicle, e.g. a throttle motor 9. The throttle motor 9 is provided in an intake passage 7 of the engine 6 and drives a throttle valve 8 for adjusting engine output.

The electronic control unit 1, provided in the vehicle, acquires a driving situation of the vehicle from results of detection as yielded by the sensors and the switches. Then, the electronic control unit 1 controls the vehicle by outputting command signals to the respective actuators in accordance with the driving situation of the vehicle as acquired. For example, the electronic control unit 1 controls the output from the engine 6 by controlling, in accordance with the amount of accelerator operation ACCP, the extent to which the throttle valve 8 is opened. Since the output from the engine 6 varies according to the amount of accelerator operation ACCP, the acceleration of the vehicle also varies according to the amount of accelerator operation ACCP. Therefore, the acceleration sensor 21 constitutes a detection section for detecting a parameter that indicates a traveling state of the vehicle that varies according to the amount of accelerator operation.

In contrast, upon determining that the amount of accelerator operation ACCP satisfies a predetermined condition and therefore that the driver is pressing hard on the accelerator pedal 2, the electronic control unit 1 performs, as one of various types of control, an output reduction process of controlling the output from the engine 6 so that it is lower than an output based on the amount of accelerator operation ACCP.

When the output reduction process is performed while the vehicle is on a rising gradient road, the drive force output from the engine 6 becomes insufficient, and as a result the driver must press harder on the accelerator pedal 2.

Therefore, in the present embodiment, the output reduction process is performed in consideration of the gradient of a sloping road.

Figure 2:
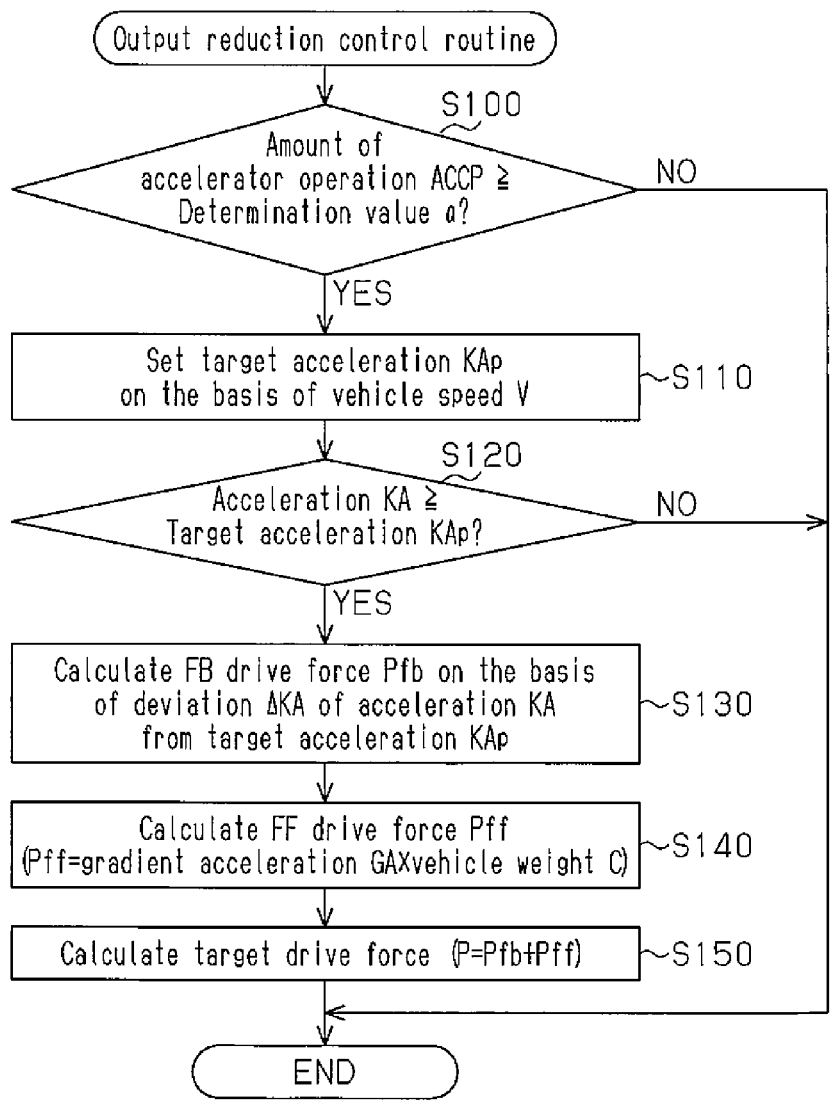
FIG. 2 is a flowchart showing a procedure of an output reduction control routine in the first embodiment.

FIG. 2 shows a procedure of an output reduction control routine that is performed in the present embodiment. This routine is repeatedly performed by the electronic control unit 1 at predetermined intervals of time.

First, when starting the routine, the electronic control unit 1 determines whether the amount of accelerator operation ACCP is greater than or equal to a determination value $\alpha$ (S100). Then, if the amount of accelerator operation ACCP is less than the determination value $\alpha$ (S100: NO), the electronic control unit 1 temporarily suspends the routine.

On the other hand, if the amount of accelerator operation ACCP is greater than or equal to the determination value $\alpha$ (S100: YES), the electronic control unit 1 determines that the driver is pressing hard on the accelerator pedal 2, and proceeds to execute step S110 and its subsequent steps of the process.

Figure 3:
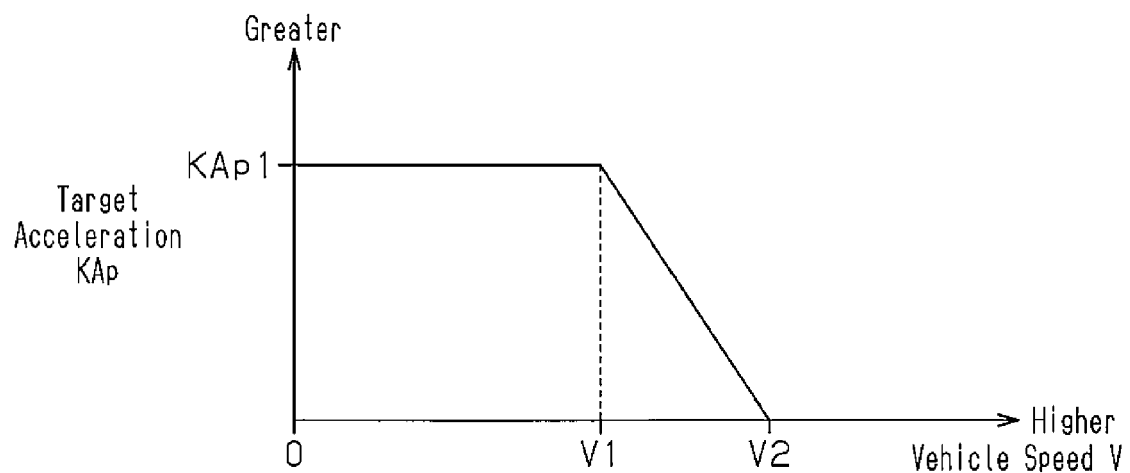
FIG. 3 is a graph showing a relationship between a target acceleration and the vehicle speed.

In step S110, the electronic control unit 1 sets a target acceleration KAp on the basis of the vehicle speed V. In this step, as shown in FIG. 3, when the vehicle speed V is lower than a first vehicle speed V1, the electronic control unit 1 sets the target acceleration KAp at a certain fixed value KAp1 determined in advance. Further, when the vehicle speed V is equal to or higher than the first vehicle speed V1 and is lower than a second vehicle speed V2, which is set at a higher value than the first vehicle speed V1, the electronic control unit 1 causes the target acceleration KAp to become gradually smaller as the vehicle speed V increases. Furthermore, when the vehicle speed V is equal to or higher than the second vehicle speed V2, the electronic control unit 1 sets the target acceleration KAp at 0. Therefore, when the vehicle speed V exceeds the first vehicle speed V1, the increase in vehicle speed becomes milder. Moreover, when the vehicle speed V reaches the second vehicle speed V2, the vehicle speed V is held at the second vehicle speed V2. By setting the target acceleration KAp in this manner, the electronic control unit 1 limits the vehicle speed V to the second vehicle speed V2 or lower.

Next, the electronic control unit 1 determines whether the actual acceleration KA of the vehicle is greater than or equal to the target acceleration KAp (S120). The acceleration KA is calculated from a differential value of the vehicle speed V.

If the acceleration KA is less than the target acceleration KAp (S120: NO), the electronic control unit 1 temporarily suspends the routine.

On the other hand, if the acceleration KA is greater than or equal to the target acceleration KAp (S120: YES), the electronic control unit 1 executes step S130 and its subsequent steps of the output reduction process.

First, in step S130, the electronic control unit 1 calculates a feedback drive force (FB drive force) Pfb, i.e. a feedback control value, on the basis of a deviation $\Delta KA$ ($\Delta KA = KA - KAp$) of the acceleration KA from the target acceleration KAp. That is, this FB drive force Pfb is a value that is calculated through feedback control on the basis of the deviation $\Delta KA$, and is variably set according to the magnitude of the deviation $\Delta KA$.

Next, the electronic control unit 1 calculates a feedforward drive force (FF drive force) Pff, i.e. a feedforward control value, on the basis of a gradient acceleration GA and a vehicle weight C (S140). The FF drive force is a value obtained by multiplying the gradient acceleration GA by the vehicle weight C. The vehicle weight C is a value set in advance for each type of vehicle. Further, the gradient acceleration GA is a substitution value representing the magnitude of the gradient of a sloping road.

Figure 4:
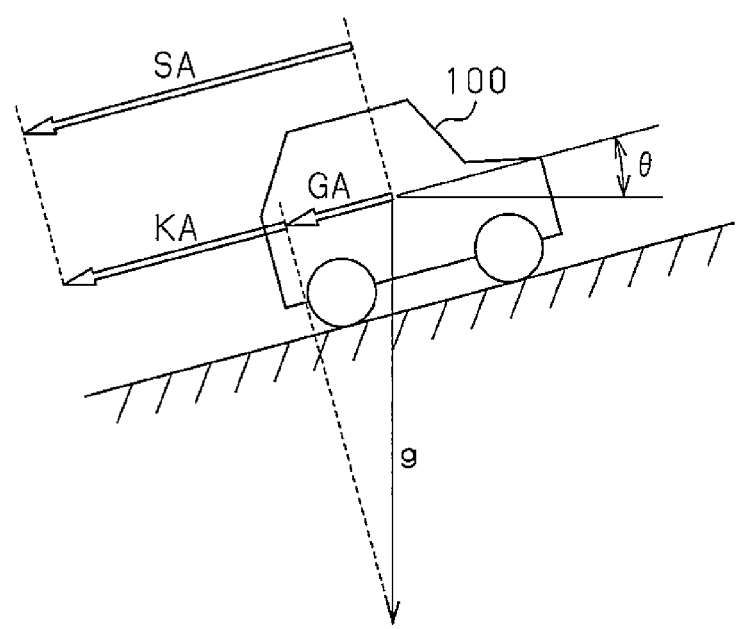
FIG. 4 is a schematic diagram showing a relationship between the acceleration of a vehicle and a road gradient.

As shown in FIG. 4, when the vehicle 100 is on a rising gradient road having an angle $\theta$, the sensor acceleration SA, which is detected by the acceleration sensor 21, takes on a value obtained by adding up the gradient acceleration GA, which is a component of force of gravitational acceleration g (g=9.8 m/s^2), and the acceleration KA of the vehicle. The gradient acceleration GA is a value that is obtained as $g \times \sin \theta$, and the value of the gradient acceleration GA becomes greater as the rising gradient becomes steeper. Therefore, the gradient acceleration GA can be utilized as a substitution value representing the magnitude of the gradient of an uphill slope. Moreover, the sensor acceleration SA is a value that is actually measured by the acceleration sensor 21, and the acceleration KA is a value that is obtained by differentiating the vehicle speed V as mentioned above. Therefore, in the present embodiment, the gradient acceleration GA on an uphill slope is calculated by subtracting the acceleration KA from the sensor acceleration SA.

The aforementioned FF drive force Pff is a value that is calculated through feedforward control on the basis of the gradient acceleration GA, and the FF drive force Pff takes on a greater value as the gradient acceleration GA becomes greater.

Then, in step S150, the electronic control unit 1 calculates a target drive force P by adding the FF drive force Pff to the FB drive force Pfb, and temporarily suspends the routine. Having thus calculated the target drive force P, the electronic control unit 1 controls the output from the engine 6 while taking into account the current reduction gear ratio of the gearbox to achieve the target drive force P.

By performing such an output reduction control routine, the electronic control unit 1 performs an output reduction process of reducing the output from the engine 6 with the use of a parameter of the vehicle that varies according to the amount of accelerator operation ACCP, i.e. the sensor acceleration SA. More specifically, the electronic control unit 1 performs a process of reducing the output from the engine 6 with the use of values detected by the acceleration sensor 21 and the vehicle speed sensor 20, such that the actual acceleration KA does not exceed the target acceleration KAp, which serves as a threshold value.

Moreover, the degree of reduction in output during execution of the output reduction process varies according to the gradient of the road surface. More particularly, the FB drive force Pfb is set through feedback control on the basis of the deviation ΔKA of the actual acceleration KA from the target acceleration KAp of the vehicle as set on the basis of the vehicle speed V. Further, the FF drive force Pff is set through feedforward control in such a manner as to take on a greater value when the gradient of the sloping road is steeper and the gradient acceleration GA is therefore greater. Moreover, the target drive force P during execution of the output reduction process is calculated as a value obtained by adding up the FB drive force Pfb and the FF drive force Pff. Therefore, the steeper the gradient of the road surface becomes, the greater the FF drive force Pff becomes, so does the target drive force P. That is, the degree of reduction in output during execution of the output reduction process becomes smaller as the gradient of the uphill slope becomes steeper.

Since the FF drive force Pff, which constitutes the target drive force P, varies according to the gradient acceleration GA, the degree of reduction in output during execution of the output reduction process varies according to the gradient of the road surface. This makes it possible to optimize the output on the sloping road in accordance with the gradient.

Incidentally, the sensor acceleration SA that is detected by the acceleration sensor 21 is utilized to adjust the output from the engine 6 in accordance with the gradient. An abnormality in the acceleration sensor 21 makes it impossible to accurately detect the sensor acceleration SA. This makes it impossible to calculate the FF drive force Pff based on a gradient. Such incapability of accurately calculating the FF drive force Pff causes the degree of reduction in output to be excessive or insufficient, thus causing the actual acceleration to be excessive or insufficient.

Further, although the acceleration KA is calculated from a value detected by the vehicle speed sensor 20, the vehicle speed sensor 20 cannot determine in which direction the vehicle is traveling.

Figure 5:
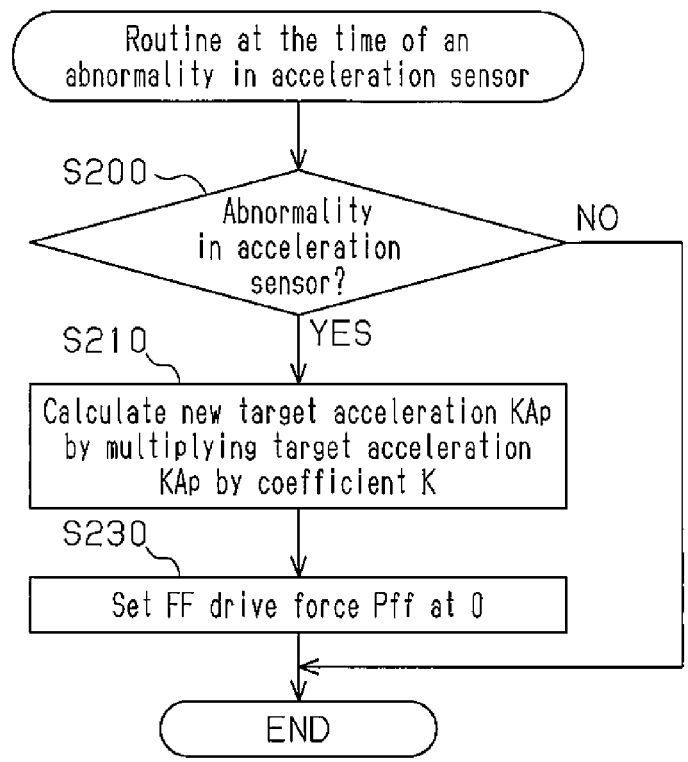
FIG. 5 is a flowchart showing a procedure of a routine that is performed at the time of an abnormality in an acceleration sensor in the first embodiment.

Therefore, in the present embodiment, a routine shown in FIG. 5 is performed at the time of an abnormality in the acceleration sensor 21. This routine, too, is repeatedly performed by the electronic control unit 1 at predetermined intervals of time.

First, when starting the routine, the electronic control unit 1 determines whether there is an abnormality in the acceleration sensor 21 (S200). A determination of an abnormality in the acceleration sensor 21 can be made by employing any appropriate method. For example, the presence of an abnormality in the acceleration sensor 21 can be determined when a value detected by the acceleration sensor 21 is an abnormal value or when the detected value does not change for an inordinate length of time.

Then, if there is no abnormality in the acceleration sensor 21 (S200: NO), the electronic control unit 1 temporarily suspends the process.

On the other hand, if there is an abnormality in the acceleration sensor 21 (S200: YES), the electronic control unit 1 sets, as a new target acceleration KAp, a value obtained by multiplying the target acceleration KA, which was set in step S110 shown in FIG. 2, by a coefficient K (S210). The coefficient K is a value for increasing the target acceleration KAp greater (for achieving a greater acceleration), and is appropriately set at a value of 1 or greater.

Next, since the value of the gradient acceleration GA is unreliable when there is an abnormality in the acceleration sensor 21, the electronic control unit 1 sets the value of FF drive force Pff, which is calculated on the basis of the gradient acceleration GA, at 0 (S230), and temporarily suspends the process.

Figure 6:
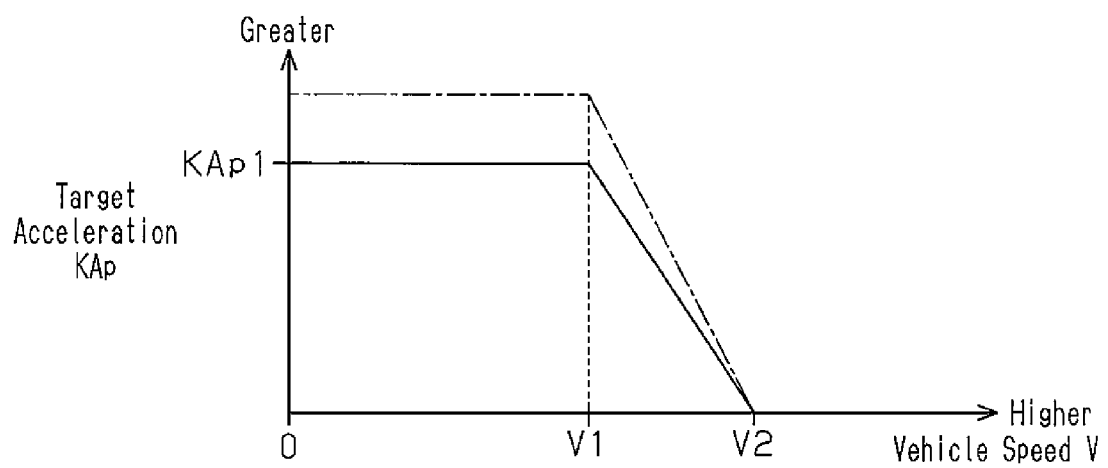
FIG. 6 is a graph showing a relationship between the target acceleration and the vehicle speed when there is an abnormality in the acceleration sensor.

Next, operation of the routine at the time of an abnormality will be described with reference to FIG. 6. In FIG. 6, the solid line indicates the target acceleration KAp as observed when there is no abnormality in the acceleration sensor 21, and the alternate long and short dash line indicates the target acceleration KAp as observed when there is an abnormality in the acceleration sensor 21.

First, when there is an abnormality in the acceleration sensor 21, the value of the FF drive force Pff is set at 0. This prevents the output from the engine 6 from being controlled on the basis of an erroneous gradient acceleration GA.

Further, as indicated by the alternate long and short dash line in FIG. 6, the target acceleration KAp is made greater when there is an abnormality in the acceleration sensor 21 than that in a case in which there is no abnormality in the acceleration sensor 21. The increased target acceleration KAp makes it easier for the actual acceleration of the vehicle to be increased, thus making it possible to avoid the deterioration of drivability such as insufficient acceleration.

Further, in the present embodiment, the target acceleration KAp as observed when there is an abnormality in the acceleration sensor 21 takes on a value obtained by multiplying, by the coefficient K, the target acceleration KAp as observed when there is no abnormality in the acceleration sensor 21. Therefore, when the vehicle speed V is equal to or higher than the second vehicle speed V2, the target acceleration KAp is set at 0, regardless of whether or not there is an abnormality in the acceleration sensor 21. Therefore, also when there is an abnormality in the acceleration sensor 21, the vehicle speed V is limited to the second vehicle speed V2 or lower.

Thus, the present embodiment has the acceleration sensor 21, which detects a parameter that indicates a traveling state of the vehicle that varies according to the amount of accelerator operation ACCP, i.e. the acceleration of the vehicle, and, in performing the output reduction process of reducing the output from the engine 6, utilizes the sensor acceleration SA detected by the acceleration sensor 21. Moreover, when there is an abnormality in the acceleration sensor 21, the degree of reduction in output by the output reduction process is made smaller by making the target acceleration KAp greater than that in a case in which there is no abnormality in the acceleration sensor 21. This makes it possible to reduce the adverse impact of an abnormality in the acceleration sensor 21 on the output reduction process, thus making it also possible to prevent the actual acceleration from becoming excessive or insufficient due to excessive or insufficient output from the engine 6. This also makes it possible to reduce the deterioration of drivability due to excess or insufficiency of acceleration and decrease a feeling of anxiety that the driver would experience if he/she could not achieve the intended acceleration, thus making it possible to both improve drivability and achieve a feeling of security.

As described above, the present embodiment brings about the following advantages.

(1) When there is an abnormality in the acceleration sensor 21, the target acceleration KAp is made greater than that in a case in which there is no abnormality in the acceleration sensor 21, and the vehicle speed V is limited to the second vehicle speed V2 or lower. This makes it less likely that the acceleration of the vehicle is limited more than necessary, thus making it possible to avoid the deterioration of drivability such as insufficient acceleration.

(2) A gradient correction to the output from the engine 6 is made with the use of a value detected by the acceleration sensor 21. However, when there is an abnormality in the acceleration sensor 21, a gradient correction is inhibited by setting the FF drive force Pff at 0 as mentioned above. This makes it possible to prevent the output from the engine 6 from being controlled on the basis of an erroneous gradient acceleration GA. Moreover, when there is an abnormality in the acceleration sensor 21, the degree of reduction in output is made smaller by making the target acceleration KAp greater as mentioned above.

(3) When there is an abnormality in the acceleration sensor 21, the degree of reduction in output by the output reduction process is made smaller by making the target acceleration KAp greater than that in a case in which there is no abnormality in the acceleration sensor 21. This makes it possible to reduce the adverse impact of an abnormality in the acceleration sensor 21 on the output reduction process, thus making it also possible to prevent the actual acceleration from becoming excessive or insufficient due to excessive or insufficient output from the engine 6. This makes it possible to reduce the deterioration of drivability due to excess or insufficiency of acceleration and decrease a feeling of anxiety that the driver would experience, for example, if he/she could not achieve the intended acceleration, thus making it possible to both improve drivability and achieve a feeling of security.

Second Embodiment

Figure 7:
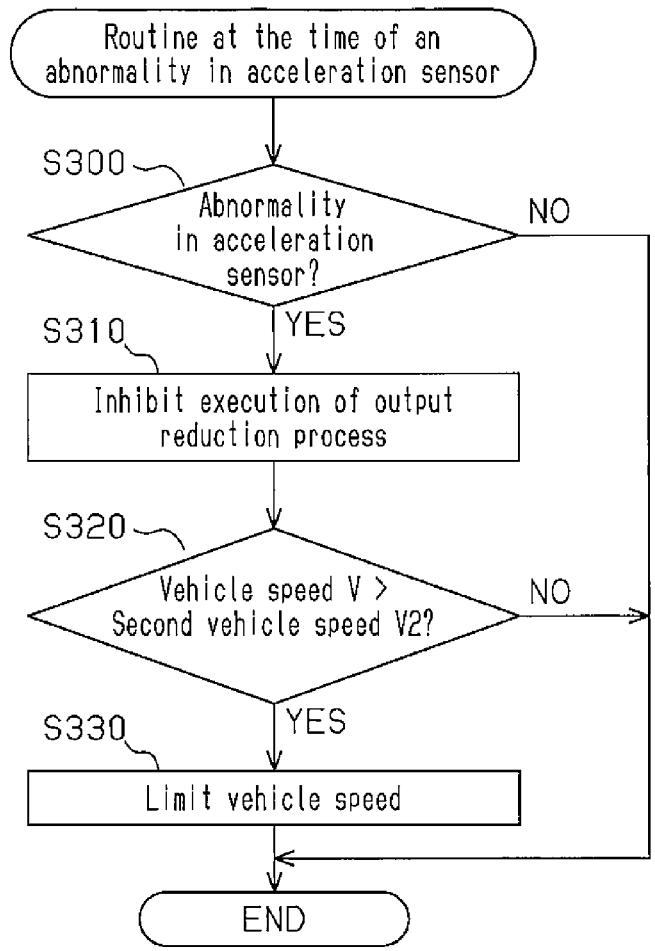
FIG. 7 is a flowchart showing a procedure of a routine that is performed at the time of an abnormality in an acceleration sensor in a second embodiment.

Next, an apparatus for controlling a vehicle according to a second embodiment of the present invention will be described below with reference to FIG. 7.

In the first embodiment, the degree of reduction in output by the output reduction process is made smaller at the time of an abnormality in the acceleration sensor 21. More specifically, the target acceleration KAp is made greater.

In the present embodiment, the degree of reduction in output by the output reduction process is made even smaller at the time of an abnormality in the acceleration sensor 21. More specifically, the degree of reduction in output by the output reduction process is made substantially 0 by inhibiting execution of the output reduction process at the time of an abnormality in the acceleration sensor 21.

A routine that is performed at the time of an abnormality in the acceleration sensor 21 in the present embodiment will be described with reference to FIG. 7. This routine, too, is repeatedly performed by the electronic control unit 1 at predetermined intervals of time.

First, when starting the routine, the electronic control unit 1 determines whether there is an abnormality in the acceleration sensor 21 (S300). A determination of an abnormality in the acceleration sensor 21 can be made by employing any appropriate method. For example, the presence of an abnormality in the acceleration sensor 21 can be determined when a value detected by the acceleration sensor 21 is an abnormal value or when the detected value does not change for an inordinate length of time.

Then, if there is no abnormality in the acceleration sensor 21 (S300: NO, the electronic control unit 1 temporarily suspends the process.

On the other hand, if there is an abnormality in the acceleration sensor 21 (S300: YES), the electronic control unit 1 inhibits execution of the output reduction process (S310). The execution of the process in step S310 puts a stop to the process of controlling the output from the engine 6 so that the acceleration KA reaches the target acceleration KAp, more particularly the process concerning the calculation of the target drive force P as described in the first embodiment. This puts a stop to acceleration control that adjusts the output from the engine 6.

Next, the electronic control unit 1 determines whether the current vehicle speed V is higher than a predetermined speed (for example, the second vehicle speed V2 described in the first embodiment) (S320). Then, if the vehicle speed V is equal to or lower than the predetermined speed (S320: NO), the electronic control unit 1 temporarily suspends the process.

If the vehicle speed V is higher than the predetermined speed (S320: YES), the electronic control unit 1 limits the vehicle speed (S330). In limiting the vehicle speed, the electronic control unit 1 performs speed limit control to adjust the output from the engine 6 so that the vehicle speed V is equal to or lower than the predetermined speed (for example, the second vehicle speed V2 described above). The electronic control unit 1 limits the vehicle speed upon determining that the amount of accelerator operation ACCP is greater than or equal to the determination value α and therefore that the driver is pressing hard on the accelerator pedal 2. Further, having thus limited the vehicle speed, the electronic control unit 1 temporarily suspends the process.

Next, operation of the routine at the time of an abnormality in the present embodiment will be described.

First, when there is an abnormality in the acceleration sensor 21, the output reduction process, which is performed by utilizing the second acceleration SA (more particularly the gradient acceleration GA), i.e. a value detected by the acceleration sensor 21, is inhibited. Accordingly, an output reduction based on an erroneous gradient acceleration GA is inhibited. This prevents the degree of reduction in output from being so insufficient that the acceleration becomes excessively great or, on the contrary, prevents the degree of reduction in output from becoming so excessive that the acceleration is insufficient, thus making it possible to avoid the deterioration of drivability. In particular, the acceleration will not be reduced on the basis of an erroneous gradient acceleration GA.

Inhibition of execution of the output reduction process of adjusting the output from the engine 6 so that the acceleration KA does not exceed the target acceleration KAp may cause an excessive increase in vehicle speed V. In order to prevent such an excessive increase in vehicle speed V, the present embodiment limits the vehicle speed V to a predetermined speed or lower when there is an abnormality in the acceleration sensor 21. This also makes it possible to achieve the driver's feeling of security.

Thus, the present embodiment, too, has the acceleration sensor 21, which detects a parameter of the vehicle that varies according to the amount of accelerator operation ACCP, i.e. the acceleration of the vehicle, and, in performing the output reduction process of reducing the output from the engine 6, utilizes the sensor acceleration SA detected by the acceleration sensor 21. Moreover, when there is an abnormality in the acceleration sensor 21, the degree of reduction in output by the output reduction process is set at 0 by inhibiting execution of the output reduction process. This makes it possible to more appropriately reduce the adverse impact of an abnormality in the acceleration sensor 21 on the output reduction process, thus making it also possible to further prevent the actual acceleration from becoming excessive or insufficient due to an excessive or insufficient degree of reduction in output from the engine 6. This also makes it possible to reduce the deterioration of drivability due to excess or insufficiency of acceleration and decrease a feeling of anxiety that the driver would experience if he/she could not achieve the intended acceleration, thus making it possible to both improve drivability and achieve a feeling of security.

As described above, the present embodiment brings about the following advantages.

(1) First, when there is an abnormality in the acceleration sensor 21, execution of the output reduction process is inhibited, and the vehicle speed V is limited to a predetermined speed or lower. Accordingly, an output reduction based on an erroneous gradient acceleration GA is inhibited. This prevents the degree of reduction in output from being so insufficient that the acceleration becomes excessively great or, on the contrary, prevents the degree of reduction in output from becoming so excessive that the acceleration is insufficient, thus making it possible to avoid the deterioration of drivability.

(2) In the output reduction process, a gradient correction to the output from the engine 6 is made with the use of a value detected by the acceleration sensor 21. However, when there is an abnormality in the acceleration sensor 21, execution of acceleration control including a gradient correction is inhibited by inhibiting execution of the output reduction process that is performed with the use of a value detected by the acceleration sensor 21. This prevents the acceleration from being reduced on the basis of an erroneous gradient acceleration GA.

(3) When there is an abnormality in the acceleration sensor 21, the degree of reduction in output by the output reduction process is set at substantially 0 by inhibiting execution of the output reduction process of controlling the output so that the acceleration KA reaches the target acceleration KAp. This makes it possible to reduce the adverse impact of an abnormality in the acceleration sensor 21 on the output reduction process, thus also making it possible to prevent the actual acceleration from becoming excessive or insufficient due to an excessive or insufficient degree of reduction in output from the engine 6. This makes it possible to reduce the deterioration of drivability due to excess or insufficiency of acceleration and decrease a feeling of anxiety that the driver would experience, for example, if he/she could not achieve the intended acceleration, thus making it easier to both improve drivability and achieve a feeling of security.

The above embodiments may be modified as follows.

In the routine shown above in FIG. 2, for a judgment as to whether to execute the output reduction process, it is determined whether the driver is pressing hard on the accelerator pedal 2. Moreover, such a determination is made by making a comparison between the amount of accelerator operation ACCP and the determination value α. Alternatively, it is also possible to determine whether the amount of accelerator operation satisfies a predetermined condition in a different manner. For example, it is possible to set the condition that the amount of accelerator operation per unit time exceeds a predetermined value, i.e. a rate of change in amount of accelerator operation exceeds a predetermined value, the condition that a rate of change in amount of accelerator operation per unit time exceeds a predetermined value, i.e. the acceleration of a change in amount of accelerator operation exceeds a predetermined value, and similar conditions.

Figure 8:
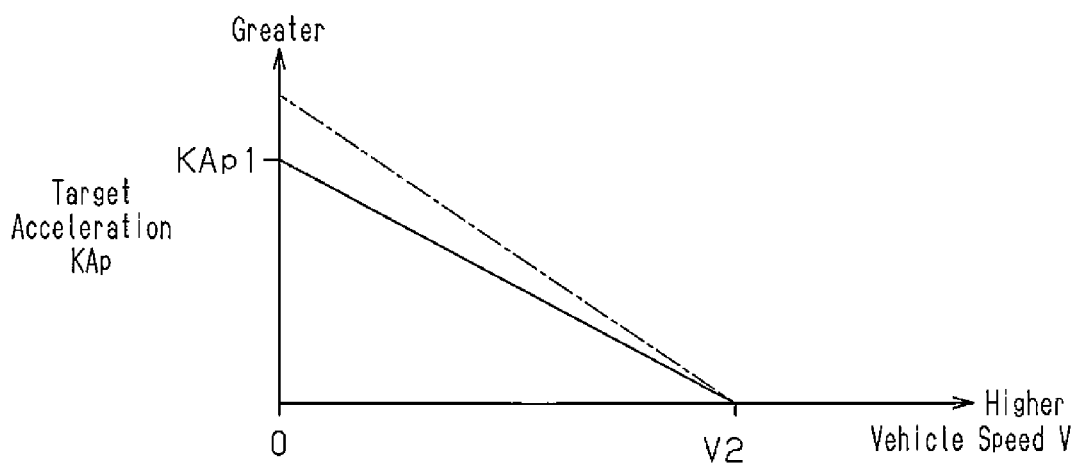
FIG. 8 is a graph showing a relationship between the target acceleration and the vehicle speed in a modification of the first embodiment.

The target acceleration KAp is set as follows. As shown above in FIG. 3, when the vehicle speed V is in the range of 0 to lower than the first vehicle speed V1, the target acceleration KAp is set at a fixed value KAp1. Alternatively, as shown in FIG. 8, when the vehicle speed V is in the range of 0 to a value lower than the second vehicle speed V2, the target acceleration KAp may be variably set in such a manner as to become gradually smaller with increase in vehicle speed V. In this modification, too, as indicated by the alternate long and short dash line, the target acceleration KAp is made greater when there is an abnormality in the acceleration sensor 21 than that in a case in which there is no abnormality in the acceleration sensor 21.

In order that the degree of reduction in output during execution of the output reduction process varies according to the gradient of the road surface, the FF drive force Pff is calculated on the basis of the gradient acceleration GA, whereby a compensation for the insufficiency of output on a gradient is made through feedforward control. Alternatively, it is possible to vary the degree of reduction in output according to the gradient of the road surface in a different manner. For example, it is possible to correct the target acceleration KAp according to the magnitude of the gradient, instead of calculating the FF drive force Pff. This modification can be embodied, for example, by providing a correction coefficient HK that takes on a greater value as the gradient acceleration GA becomes greater and reflecting the correction coefficient HK in the target acceleration KAp. Moreover, in the case of this modification, advantages that are similar to those brought about by the first embodiment can be brought about by setting the correction coefficient HK at 1, instead of the process in step S230 shown above in FIG. 5.

In order that the degree of reduction in output during execution of the output reduction process varies according to the gradient of the road surface, a compensation for the insufficiency of output on a gradient is made through feedforward control. Alternatively, it is also possible to vary the degree of reduction in output according to the gradient of the road surface in a different manner. For example, it is possible to vary, according to the magnitude of a gradient, a feedback gain G that is used in feedback control for calculating the FB drive force Pfb, instead of calculating the FF drive force Pff. In this case, it is desirable to variably set the feedback gain G so that the feedback gain G becomes greater as the gradient becomes steeper. Moreover, in the case of this modification, advantages that are similar to those brought about by the first embodiment can be brought about by inhibiting the variable setting of the feedback gain G and setting the feedback gain G when the gradient angle is 0°, instead of the process in step S230 shown above in FIG. 5.

The gradient acceleration GA, which is obtained by subtracting the acceleration KA (KA=differential value of the vehicle speed V) of the vehicle from the sensor acceleration SA, is utilized as a substitution value for the gradient of a sloping road. Alternatively, it is also to detect the gradient of a sloping road in a different manner. For example, it is possible to separately provide a sensor for detecting a gradient.

In the output reduction control routine shown above in FIG. 2, a gradient correction to the output from the engine 6 is made by executing the process including step S140. Alternatively, the present invention is also applicable to a case where such a gradient correction is not made. That is, the present invention is also applicable to an apparatus for controlling a vehicle, including a control device that performs a process of reducing an output from the engine 6 with the use of a value detected by an acceleration sensor, such that the acceleration of the vehicle does not exceed a predetermined threshold value; and a detection section that detects a parameter that indicates a traveling state of the vehicle that varies according to the amount of accelerator operation, the parameter being used during execution of the output reduction process of reducing the output from the engine 6. In this case, it is possible to use, as the acceleration of the vehicle, a differential value of the vehicle speed V that is detected by the vehicle speed sensor 20, and the vehicle speed sensor 20 can be used instead of the acceleration sensor 21.

The parameter that indicates a traveling state of the vehicle that varies according to the amount of accelerator operation is a value detected by the acceleration sensor 21 detecting the acceleration of the vehicle. Alternatively, it is also possible to use another value as the parameter. For example, it is possible to calculate an amount of change in vehicle speed per unit time (differential value of the vehicle speed) detected by the vehicle speed sensor and use the calculated value as the parameter.

In each of the embodiments described above, an accelerator operation is performed through pressing on the accelerator pedal 2. Alternatively, an accelerator operation may be performed through an operation other than pressing on the pedal. Examples of operations other than pressing on the pedal include an operation, such as a paddle shift, that involves the use of a hand and voice activation.

In each of the embodiments described above, a case has been described in which a drive force control apparatus of the present invention is applied to a vehicle including an engine 6 as a power source. However, the present invention is also applicable to an electric automobile including a motor as a power source, and a hybrid automobile including a motor and an engine as power sources.

DESCRIPTION OF THE REFERENCE NUMERALS

1 . . . Electronic control unit (1a . . . Central processing unit (CPU), 1b . . . Read-only memory (ROM), 1c . . . Random access memory (RAM)), 2 . . . Accelerator pedal, 3 . . . Accelerator pedal sensor, 6 . . . Engine (power source), 7 . . . Intake passage, 8 . . . Throttle valve, 9 . . . Throttle motor, 20 . . . Vehicle speed sensor, 21 . . . Acceleration sensor, 100 . . . Vehicle.

The invention claimed is:

1. An apparatus for controlling a vehicle, comprising:
an acceleration sensor that detects an acceleration of the vehicle; and
an electronic control unit that is programmed to execute an output reduction process of reducing an output from a power source of the vehicle with use of a value detected by the acceleration sensor, such that the acceleration does not exceed a predetermined threshold value,
wherein, when there is an abnormality in the acceleration sensor, the electronic control unit is programmed to set the predetermined threshold value to be greater than that in a case in which there is no abnormality in the acceleration sensor, and limit a vehicle speed to a predetermined speed value or lower.

2. An apparatus for controlling a vehicle, comprising:
an acceleration sensor that detects an acceleration of the vehicle; and
an electronic control unit that is programmed to execute an output reduction process of reducing an output from a power source of the vehicle with use of a value detected by the acceleration sensor, such that the acceleration does not exceed a predetermined threshold value,
wherein, when there is an abnormality in the acceleration sensor, the electronic control unit is programmed to stop the output reduction process and limit a vehicle speed to a predetermined speed value or lower.

3. An apparatus for controlling a vehicle, comprising:
a sensor that detects a parameter that indicates a traveling state of the vehicle that varies according to an amount of accelerator operation; and
an electronic control unit that is programmed to execute an output reduction process of reducing an output from a power source of the vehicle with use of the parameter during operation of the power source,
wherein, when there is an abnormality in the sensor, the electronic control unit is programmed to set a degree of reduction in output by the output reduction process to be smaller than that in a case in which there is no abnormality in the sensor.

4. The apparatus according to claim 3, wherein the electronic control unit is programmed to set the degree of reduction in output at 0 when there is an abnormality in the sensor.

5. The apparatus according to claim 3, wherein the parameter is a value detected by an acceleration sensor that detects the acceleration of the vehicle.

* * * * *